United States Patent Office 3,293,201
Patented Dec. 20, 1966

3,293,201
EMULSIONS OF CURABLE RESINOUS COMPOSITIONS AND A SALT OF AN ADDUCT OF AN UNSATURATED DICARBOXYLIC ACID AND A FATTY OIL
Fred S. Shahade, New Kensington, and Roger M. Christenson, Gibsonia, Pa., assignors to Pittsburgh Plate Glass Company, Pittsburgh, Pa., a corporation of Pennsylvania
No Drawing. Filed Mar. 7, 1962, Ser. No. 177,991
6 Claims. (Cl. 260—23)

This invention relates to emulsion primer compositions, and particularly this invention relates to emulsions of curable resinous compositions containing the salt of an adduct of a dicarboxylic acid or anhydride and a fatty acid ester such as a drying oil, a semi-drying oil or a long oil alkyd and synthetic esters.

In recent years, considerable effort has been put forth to provide an aqueous composition which could be used as an effective house paint. The compositions which have proved to be of greatest commercial interest have been various latices of thermoplastic polymers. Ease of clean-up and application as compared with common oil base paints has made them popular. The copolymers of vinyl acetate or other compositions such as the acrylates or vinyl compounds have been the most desirable because of their extreme durability in weathering. These compositions, however, have poor adhesion to new wood surfaces or to painted surfaces having any degree of chalking. When they are used directly over wood, the coatings frequently suffer from grain cracking and flaking on exposure. Moreover, redwood and cedar surfaces tend to stain the coatings.

In order for the said latex compositions to provide a durable protective coating for these surfaces, a primer must be employed. Examples of compositions which may be employed as primers for the said latex top coats include many of the air drying or curing types of materials which can be provided as an emulsion. Particular compositions include epoxy esters, esterified unsaturated alcohol polymers, drying oils themselves and alkyd resins modified with the drying oils and the diisocyanate modified alkyd resins or oils. These primers should have good adhesion to the thermoplastic latex materials and also to the new wood or chalky surfaces. Many of the compositions which have been employed as primers have extremely good adhesion to the thermoplastic latex materials, but they have limited wettability of the new wood or chalky surfaces; and consequently poor adhesion to these surfaces. Moreover, they are difficult to apply because of poor brushing and lapping, do not clean readily from the brush, and are often unstable as an aqueous emulsion, sometimes because of the destructive action of various bacteria. Moreover, the applied coatings are frequently attacked by mildew.

It has now been discovered that compositions having excellent wettability of new wood surfaces and chalky surfaces, excellent brushing and lapping properties, excellent brush rinsability and also mildewcidal properties can be obtained by blending the salt of an adduct of a dicarboxylic acid or anhydride and an unsaturated fatty ester with the aforesaid primer compositions. Moreover, improved brush rinsability is imparted to the said primer compositions by the said adducts.

The invention is carried out by preparing an emulsion medium containing one or more of the said air drying materials using standard emulsifying techniques and blending a salt of the said adduct therewith.

Particularly useful and adaptable as emulsifiers are glycerol monooleates and laurates and also salts of fatty alcohol sulfates, dioctyl ester of sodium sulphosuccinic acid, polyethylene oxide condensation product, sodium salts of alkyl aryl polyether sulfate, and the like.

Blends of the adduct salt solutions with the various air drying emulsion compositions are easily prepared by merely adding one component to the other with the use of a normal amount of agitation.

The adduct salts may be used advantageously in amounts ranging from about 5 percent to about 70 percent by weight of the total primer composition and preferably in amounts of about 15 to about 25 percent by weight of the total primer composition. There is in reality no upper limit to the amount of the adduct except that amounts in excess of 70 percent by weight tend to impart water sensitivity to the primer composition.

The primer compositions of the instant invention are usually applied by brushing, but an intelligent adjustment of viscosity with water and surface active agent allows them to be applied effectively by spraying, roll coating, or other well known methods of application.

In preparing the adduct of the dicarboxylic acid anhydride and the unsaturated fatty ester it is desirable that from 6 percent to 45 percent by weight of the unsaturated acid anhydride be reacted with from about 55 percent to 86 percent by weight of the unsaturated fatty ester. If less than 6 percent by weight of the unsaturated acid anhydride is employed, the adducts will be only partially water soluble unless water soluble organic solvents are employed to give water solubility.

To form the adducts of the present invention, the dicarboxylic acid or anhydride is reacted with a drying oil or semi-drying oil fatty acid ester. Preferably the drying oils and semi-drying oils per se are employed. Generally the drying oils are those oils which have an iodine value of above about 130 and the semi-drying oils are those which have an iodine value of about 90 to 130 as determined by method ASTM-D-1467-57T. Included among these oils are linseed oil, soya oil, safflower oil, perilla oil, tung oil, oiticica oil, poppyseed oil, sunflower oil, tall oil esters, walnut oil, dehydrated castor oil, herring oil, menhaden oil, sardine oil, and the like. Also included among such oils are those in which the oils per se are modified with other acids such as phthalic acid (or anhydride), or benzoic acid by first forming a di- or monoglyceride or a mixture thereof by alcoholysis, followed by esterification. Polyols other than glycerol can also be employed in the alcoholysis. Modification of the oils with cyclopentadiene, styrene or other monomers can also be employed to form useful products. Other esters of unsaturated fatty acids, for example, those prepared by the esterification of tall oil fatty acids of polyols are also useful.

Other fatty acid esters which can be reacted with the unsaturated dicarboxylic acid or anhydride to form useful adducts include the alkyd resins prepared utilizing semi-drying or drying oils, that is, semi-drying or drying oil-modified alkyd resins; esters of epoxides with semi-drying oil fatty acids or drying oil fatty acids, including esters of diglycidyl ethers of polyhydric compounds, as well as other mono-, di-, and polyepoxides; semi-drying or drying oil fatty acid esters of polyols such as butanediol, trimethylolethane, trimethylolpropane, trimethylolhexane, pentaerythritol, and the like; and semi-drying or drying oil fatty acid esters of resinous polyols such as copolymers of allyl alcohol with styrene or other $CH_2=C<$mono-mers, or non-oil modified alkyds containing free hydroxyl groups. It is intended that all of the foregoing materials be included within the definition of the term "fatty acid esters" as utilized herein.

The unsaturated dicarboxylic acid anhydride utilized in forming the adduct is an alpha, beta-ethylenically unsaturated dicarboxylic acid anhydride, such as maleic anhydride, itaconic anhydride and others. Instead of the anhydride, it is also possible to utilize ethylenically unsaturated dicarboxylic acids which form anhydrides, for example, maleic acid or itaconic acid. These acids probably function by first forming the anhydride. Fumaric acid, which does not form an anhydride, may also be utilized, although with considerably more difficulty than the unsaturated dicarboxylic acid anhydrides or the unsaturated dicarboxylic acids which form anhydrides. Mixtures of the acids and anhydrides may also be utilized. Ordinarily the anhydride employed should contain from 4 to 12 carbon atoms, although longer chain compounds can also be employed if desired.

The reaction to form the adduct probably does not take place according to a true Diels-Alder type reaction in which conjugated double bonds must be present, but instead is believed to represent the reaction of an anhydride or acid with the methylene group adjacent to a non-conjugated double bond such as is present in linseed oil. This reaction may be represented as follows, wherein maleic anhydride is utilized for illustrative purposes:

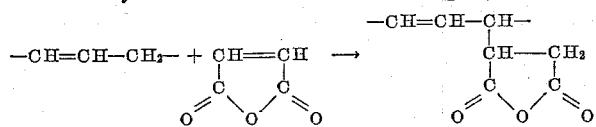

When conjugated oils such as tung oil are utilized, the reaction is probably of the Diels-Alder type.

The above reactions take place readily without the use of catalyst and at temperatures in the range of about 100° C. to 300° C. or more, with most of the reaction occurring in the range of about 200° C. to 250° C. The reaction is ordinarily complete in less than three hours. The adduct obtained is insoluble in water.

The acidity of this adduct is then at least about 50 percent neutralized with ammonia or an amine or a quaternary ammonium hydroxide. Among the amines which may be utilized are those capable of forming water soluble salts, for example, primary, secondary, and tertiary amines such as methylamine, ethylamine, propylamine, dimethylamine, diethylamine, dipropylamine, dihexylamine, trimethylamine, triethylamine, tripropylamine, tributylamine, trihexylamine, monoethanolamine, monobutanolamine, diethanolamine, dibutanolamine, triethanolamine, tributanolamine, morpholine, and the like.

The quaternary ammonium hydroxides which may be employed include trimethylbenzyl ammonium hydroxide, triethylbenzyl ammonium hydroxide, trimethyllauryl ammonium hydroxide, triethyllauryl ammonium hydroxide, tributyllauryl ammonium hydroxide, and the like. For obvious reasons of economy, availability, and ease of handling, ammonium hydroxide is the preferred neutralizing agent for the adduct.

Preferably, the pH of the neutralized and solubilized adduct should be maintained in the range of about 7.0 to 10.0. If the pH is substantially higher than about 10.0 the viscosity will be substantially lowered and may drift downwardly, whereas if the pH is lower than about 7.0 the viscosity will be increased to the point that the material may be too viscous for practical use at a reasonable solids content by ordinary application techniques, and if below 6.0 an unstable resin will result. However, it is an advantage of the materials described herein that the viscosity can readily be maintained within the desired range simply by adjustment of the pH to bring it within the 7.0 to 10.0 range.

It has also been found advantageous, although not essential, to add to the neutralized and solubilized adduct a small amount of an amino-alkyl-alkanediol, such as 2-methyl-2-amino-1,3-propanediol, 2-ethyl-2-amino-1,3-propanediol, 2-methyl-2-amino-1,4-butanediol, or the like. While the diol obviously has some neutralizing effect, it has been found that it also produces a film with considerably increased hardness and improved water resistance, even though only small amounts are added. For example, optimum efficiency is achieved when only about 4 percent by weight of the resinous components is used. Larger amounts have little or no effect on the properties of the film, whereas the water resistance appears to fall off slightly when amounts of less than about 4 percent are employed.

*Example A*

Thirty and four-tenths (30.4) parts (76 percent) of linseed oil and 9.6 parts (24 percent) of maleic anhydride were placed in a reactor and heated to a temperature of 375° F. The heat was then turned off and since the reaction is strongly exothermic, the temperature rose to 475° F. After approximately 2½ hours, the reaction mixture was added with stirring to a mixture of 10.5 parts of 28 percent aqueous ammonium hydroxide and 1.88 parts of 2-methyl-2-amino-1,3-propanediol and 49.5 parts of water. The composition had a U–X viscosity on the Gardner-Holdt scale and a solids content of 43 percent. The Gardner color was 14–16 and the weight per gallon 8.7 pounds. The pH of the composition was 8.5. A sample of the resin formed a clear solution in water at a pH of 7.5 without the use of water soluble organic solvents.

*Example B*

A composition was prepared using the same ingredients and proportions thereof as in Example A except that the 2-methyl-2-amino-1,3-propanediol was not included. The resinous product had the following properties:

Solids (percent) _____ 43
pH _____ 8.3
Viscosity _____ U–V

A series of oil-anhydride adducts was prepared utilizing varying ratios of anhydride to oil. The reaction was carried out by heating the reaction mixture to 100° C., and then gradually allowing the temperature to increase to 250° C., where it was maintained for about 15 minutes. The reaction mixture was then allowed to cool and portions thereof neutralized with ammonium hydroxide, and in some instances with mixtures of ammonium hydroxide and 2-amino-2-methyl-1,3-propanediol. Water was added to give a desired viscosity and solids content. The pertinent data are set forth in the following table.

TABLE I
*Example C*

| Oil | Anhydride | Ratio Oil/Anhydride (Percent) | Resin Neutralized (Parts by Weight) | 28 Percent Ammonium Hydroxide Utilized (Parts by Weight) | 2-Methyl-2-Amino-1,3-Propanediol (Parts by Weight) | Water Added (Parts by Weight) | Resin Solids | Gardner-Holdt Viscosity | pH |
|---|---|---|---|---|---|---|---|---|---|
| Linseed | Maleic Anhydride | 82.8/17.2 | 2,000 | 496 | | 1,504 | 48.1 | W | 9.1 |
| Do | do | 76/24 | 2,711 | 525 | 120 | 3,176 | 44.2 | U–X | 7.7 |
| Do | do | 67/33 | 1,200 | 446 | | 1,452 | 42.7 | V | 8.1 |
| Soya | do | 76/24 | 768 | 125 | 36 | 936 | 42.5 | $Z_1$–$Z_2$ | 7.7 |
| Tall Oil Fatty Acids Trimethylol Ethane Ester | do | 76/24 | 704 | 135 | | 761 | 44.0 | $Z_6$ | 8.0 |
| Benzoic Acid Modified Linseed | do | 79/21 | 3,000 | 400 | 139 | 3,678 | 41.0 | $Z_1$ | 8.0 |

Each of the preceding resinous materials formed a clear solution in water at a pH of 7.5 without the use of water soluble organic solvents to obtain solubility and solution clarity.

*Example D*

Example A is repeated substituting maleic acid and itaconic acid respectively for the maleic anhydride. In each case a resin substantially equivalent to maleic anhydride product was obtained. Similar results are achieved when a mixture of maleic acid or maleic anhydride or a mixture of maleic anhydride and itaconic acid are utilized. Water is given off during the reaction of the acids with the oil, indicating that an anhydride forms.

*Example E*

This example relates to the preparation of a salt of an adduct of maleic anhydride and linseed oil. The adduct as prepared in Example I (2500 parts) at 200° C., was charged into a vessel containing an aqueous solution consisting of 3500 parts water, 100 parts aminomethyl-1,3-propanediol and 400 parts of a 28 percent solution of ammoonium hydroxide. The reaction mass was allowed to reach 85° C. maximum and cooled, after which 35 parts of the 28 percent ammonium hydroxide solution was added thereto. The resulting resinous composition had the following properties:

Solids (percent) _____ 40.7
Viscosity (Gardner-Holdt) _____ K
pH _____ 7.3

*Example F*

Two hundred eighty (280) parts of tall oil fatty acids, 220 parts of a styrene-allyl alcohol copolymer having a molecular weight of 1150, a hydroxyl equivalent per 100 grams of 0.45, and an average hydroxyl content per mole of 5.2, and 50 parts of aromatic petroleum naphtha were heated to 225° C. for 2½ hours with azeotropic distillation to give a product having an acid value of 10. The temperature was then raised to 250° C. for an additional hour, at which time the acid value was less than 1.0. The solvent was removed by blowing with inert gas and the reaction mixture cooled to 100° C. To the product thus obtained, 125 parts of maleic anhydride was added and the resulting mixture heated under reflux to a temperature of 250° C. for ½ hour. The adduct thus formed was poured into a mixture of 2100 parts of water and 80 parts of morpholine. A clear solution having a solids content of 25 percent, a Gardner-Holdt viscosity of $Z_6+$ and a pH of 7.5 was obtained. This product could be formulated as in Example V to give a coating composition, films of which are resistant to corrosion, humidity and water.

*Example G*

The following materials were charged into a glass reactor:

Grams
Epoxy resin (epoxide equivalent 175–210; average molecular weight 350–400) _____ 700
Tall oil fatty acids _____ 2240
Xylene _____ 150

The above materials were heated for 13 hours in an atmosphere of inert gas and at a temperature ranging from 186° C. to 242° C. The product had an acid value of 24.0. The xylene was removed by blowing with an inert gas. To the product thus formed, 700 grams of maleic anhydride was added and the mixture heated at a temperature in the range of 75° C. to 251° C. for approximately 3 hours. One thousand seven hundred fifty parts (1750) of the hot resin was added to a mixture of 3500 parts of water and 240 parts of morpholine. The resulting composition had a pH of 6.5, a solids content of 37.1 percent and was slightly hazy. Useful coating compositions could be prepared from this adduct by formulating according to the method of Examples I through VIII.

*Example H*

The following materials were charged into a glass reactor:

Parts
Epoxide (having structure below) _____ 175

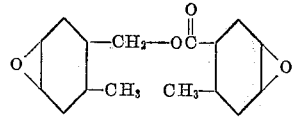

Tall oil fatty acids _____ 700
Xylene _____ 25

The above mixture was heated for a period of 9 hours at a temperature in the range of 168° C. to 190° C. under an atmosphere of inert gas. After cooling, the product had a Gardner-Holdt viscosity of K and an acid value of 25.0.

Two hundred fourteen (214) parts of maleic anhydride was added to the reactor and the resulting mixture heated for 2¼ hours at temperatures in the range of 120° C. to 203° C. After cooling the adduct thus prepared had a Gardner-Holdt viscosity of $Z_6+$. Two hundred (200) parts of this adduct was then poured into a mixture of 300 parts of deionized water and 30 parts of morpholine. The composition had a pH of 6.2. The pH was then raised to 6.5 by the addition of 4 parts of morpholine. The resulting composition was clear and formed useful coating compositions when formulated with synthetic polymeric latices in the manner described hereinabove. Films of the compositions are corrosion and humidity resistant.

*Example I*

Parts by weight
Linseed oil _____ 126.30
Maleic anhydride _____ 39.90
Water _____ 251.30
Dimethylethanolamine _____ 33.30
Phenyl mercuric acetate _____ 0.25

The linseed oil and maleic anhydride were placed in a reactor and heated to a temperature of 375° F. The heat was then turned off and since the reaction is strongly exothermic the temperature rose to 475° F. to 500° F. Two and one-half hours after the exotherm the reaction mixture was added with stirring to the water, dimethylethanolamine and the phenyl mercuric acetate at a rate so that the water solution did not exceed 150° F. The composition had the following properties:

Solids (percent) _____ 38.8
Viscosity (Gardner-Holdt) _____ S
Color _____ 12+
Density (wt./gal., lbs.) _____ 8.61
pH _____ 7.37

It is advantageous to further react the adducts with an alcohol. The alcohol opens the anhydride ring and forms an ester grouping which reduces the water sensitivity in the compositions of the instant invention. The alcohol may be a saturated or unsaturated alcohol having a long or short chain. The lower saturated type such as propanol through 2-ethylhexanol are preferred as saturated alcohols while the long chain air drying unconjugated unsaturated alcohols are the preferred unsaturated type. However, short chain unsaturated alcohols such as allyl, crotyl and cinnamyl alcohols and the like may also be used. While the saturated alcohols tend to reduce the air drying properties of the adducts they are less costly and more easily handled than the air drying fatty acid derived class.

By adjusting blends of the saturated and unsaturated alcohols the air drying properties can be controlled to a large extent.

It is of particular advantage to react the adducts with an alcohol when the adducts are present in the primer compositions in large amounts; forty percent or more.

In the following table (Table II) there are listed three different examples of the unsaturated long chain alcohol and the adduct of a dicarboxylic acid anhydride and a drying oil. The reaction of the materials set forth in the table was effected by heating the ingredients from 1 to 2½ hours at 130° C. to 150° C. and subsequently cooling and then neutralizing with dilute aqueous ammonia. (Example LL of Table II illustrates a short chain saturated alcohol being reacted with the adducts.) In Example LL the adduct and the alcohol were heated from 25° C. to 100° C. over a 1.5 hour period and then neutralized with dilute aqueous ammonia. In Examples K and L where polyethylene glycol is employed, the reaction mass was heated for an additional 2 hours at the same temperature prior to the cooling and neutralization with ammonia.

TABLE II

|  | Ex. J | Ex. K | Ex. L | Ex. LL |
|---|---|---|---|---|
| Maleic-oil adduct of Ex. A | 75.5 | 60.0 | 67.0 | 800.0 |
| Linseed oil alcohol, reduced linseed oil acid | 24.5 | 19.5 | 21.7 |  |
| Butyl alcohol |  |  |  | 148.0 |
| Polyethylene glycol 100 |  |  | 11.3 |  |
| Polyethylene glycol 400 |  | 20.5 |  |  |
| Total solids, percent | 39.8 | 57.0 | 49.4 | 38.0 |
| pH | 8.8 | 8.2 | 8.0 | 8.1 |
| Viscosity | ¹ Z₆+ | ² 10,000 | ² 14,000 | ¹ Q |

¹ Gardner-Holdt.
² C.p.s.

The air curing component of the primers of the instant invention is preferably one which contains unsaturated sites capable of undergoing air oxidation whereby the said composition cures to a hard, solvent-resistant, tough film-forming composition. These compositions are particularly adaptable to be used as resinous vehicles with or without pigmentation in areas where it is impractical to effect curing by the use of elevated temperatures.

Particularly useful are the epoxy ester resins which may be emulsified and applied as primers in the said thermoplastic latex finishing coats. These esters are prepared by totally or partially esterifying the reaction product, a bisphenol and an epichlorohydrin to form a polyglycidyl ether of a polyhydric compound. A representative epoxide resin structure may be illustrated as follows:

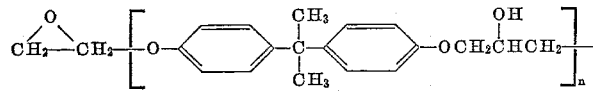

In the foregoing structure $n$ is a number of a magnitude dependent upon the degree to which the etherification is carried.

Typical epoxy resins are those prepared from bisphenol A (para, para′-isopropylidene diphenol) with epichlorohydrin. These epoxy resins may have an epoxy equivalent of about 150 to about 4000 with varying hydroxyl values. After the epoxy resin is esterified, it is then emulsified by standard emulsion techniques using any one of a number of well-known surface active agents.

*Example M*

The following example illustrates the preparation of a typical epoxy emulsion which may be employed with the instant invention:

Parts by weight
Epoxy resin (epoxide equivalent 870-1025; average molecular weight 1400) _____ 1000
Linseed oil acid _____ 1000
Xylene _____ 120

The above ingredients were then heated to 260° C. and maintained at that temperature for 5 hours while under constant agitation. Two hundred (200) parts of an aliphatic hydrocarbon solvent were then added thereto. The resulting product (1780 parts) was then mixed with octyl phenol-ethylene oxide reaction product (69 parts) and 6 percent cobalt naphthenate in mineral spirits (9.6 parts). This solution was then heated under agitation to 60° C. for 15 minutes. A solution consisting of water (1580 parts), sodium polyacrylate (24 parts), and ammonium hydroxide (138) was then added dropwise over a 2-hour period. The agitation was continued for another 15 minutes and cooled. The resulting product had the following properties:

pH _____ 10.3
Solids (percent) _____ 47.6
Viscosity (No. 3 spindle, 12 r.p.m., Brookfield viscometer) _____ cps__ 4500

Another class of air curing compositions are those prepared by esterifying hydroxyl containing polymers with a long chain unsaturated fatty acid. Very useful materials of this class are the copolymers of allyl alcohol and styrene having the following structure:

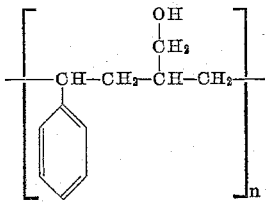

Preferably the value of $n$ is in the range of about 4 to 10, and several products of this general class are available commercially.

In the preparation of such polymers, the allyl alcohol can be repalced by other alcohols containing a polymerizable $CH_2=C<$ group, for example, methallyl alcohol, and the like, with aliphatic unsaturated alcohols containing up to about 10 carbon atoms being particularly useful. The monomeric material which is polymerized with the unsaturated alcohol to form the materials of this class may be any of the well known polymerizable ethylenically unsaturated monomeric materials set forth hereinabove, with styrene and acrylonitrile being particularly preferred. Another route to this type of polymer is through the hydrogenation of acrolein copolymers.

The esters of these compositions are prepared simply by refluxing the copolymer with the long chain fatty acid

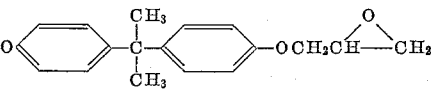

while simultaneously azeotropically removing the water of reaction. The resulting ester is then put into an aqueous emulsion by the standard techniques using any one of the previously mentioned surface active agents.

*Example N*

Parts by weight
Styrene-allyl alcohol copolymer having a molecular weight of 1150, a hydroxyl equivalent per 100 grams of 0.45, and an average hydroxyl group content per mole of 5.2 _____ 1240
Linseed oil acids _____ 980
Xylene _____ 140

The above ingredients were then heated to a temperature of about 225° C. and maintained at this tempearture for 1 hour and 15 minutes. The reaction mass was then heated gradually up to 298° C. over a 1-hour period and cooled to 220° C. and anti-skinning agent (13 parts) was added. After maintaining the temperature at 220° C. for 20 minutes 13 parts more of anti-skinning agent was added and the reaction mass cooled.

A sample of this product when cut to 60 percent solids in xylene had the following properties:

| | |
|---|---|
| Acid value | 1.8 |
| Solids (percent) | 60.0 |
| Viscosity (Gardner-Holdt) | D–E |
| Color value | 11–12 |

A solution comprising water (978 parts), 15 parts sodium polyacrylate and 86.3 parts 28 percent ammonia was added dropwise to the undiluted reaction mixture with agitation over a period of about 3½ hours, during which time the temperature was maintained between 40° C. and 50° C. After completion of the addition 1.6 parts octyl alcohol was added to the reaction mixture. The resulting product had 50.4 percent solids.

*Example O*

| | Parts by weight |
|---|---|
| Styrene-allyl alcohol copolymer having a weight of approximately 1600, and a hydroxyl content of 5.4 percent to 6.0 percent | 864 |
| Linseed oil acid | 490 |
| Xylene | 70 |

The above ingredients were reacted as in Example N until the reaction temperature rose to 298° C. The reaction mass was cooled to 220° C. and 65 parts of an anti-skinning agent were added to the reaction mass. Acid value was 1.8.

Using 1000 parts of the said product, an emulsion was prepared similarly to that in Example N. The resulting emulsion had a solids content of 48.2 percent.

Good primer compositions are also obtained by merely blending an emulsion of a drying oil with the said adducts. Drying oils which may be used for these primer compositions include those disclosed above for use with the maleinized fatty ester.

The alkyd resins which may be employed in the primer compositions of the instant invention are those prepared using polyol ester of unsaturated long chain drying oils, particularly the glycerol esters such as linseed oil and dehydrated castor oil. These oil modified alkyd resins, particularly the long oil modified resins, are emulsified in the standard manner using the above-disclosed surface active agents. Emulsions made from alkyd resins prepared with any of the above drying oils may also be used, including those made with polyols other than glycerine. Examples of other polyols include pentaerythritol, sorbitol, mannitol, ethylene glycol, diethylene glycol, propylene glycol, 2,3-dibutylene glycol and the like.

The reaction products of diisocyanates with partial esters of drying or semi-drying oil fatty acids and polyols, the urethane oils, or such products modified with some dicarboxylic acid or anhydride esterified alcoholized esters may also be blended advantageously with an adduct of an unsaturated carboxylic acid or anhydride and a drying oil to provide a composition for use as a primer for thermoplastic latex type house paints.

These urethane linked drying oil esters are prepared simply by reacting any one of the long list of diisocyanates with hydroxyl containing fatty acid esters of polyols which may be unmodified or modified with dicarboxylic acids or anhydrides. A convenient way of preparing the fatty acid partial esters is to alcoholize a glyceride oil with a polyol. Useful polyols include pentaerythritol, sorbitol, mannitol, glycerol, ethylene glycol, diethylene glycol, propylene glycol, trimethyloethane and trimethylolpropane.

The organic isocyanates which may be employed in the reaction include aromatic, aliphatic and cycloaliphatic diisocyanates and combinations of these types. Representative compounds include 2,4-tolylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis(cyclohexyl isocyanate) and 1,5-tetrahydronaphthylene diisocyanate. Arylene diisocyanates, i.e., those in which each of the two isocyanate groups is attached directly to an aromatic ring, are preferred. In general they react more rapidly with the polyalkylene ether glycols than do the alkylene diisocyanates. Compounds such as 2,4-tolylene diisocyanate in which the two isocyanate groups differ in reactivity are particularly desirable. The diisocyanates may contain other substituents, although those which are free from reactive groups other than the two isocyanate groups are ordinarily preferred. In the case of the aromatic compounds, the isocyanate groups may be attached either to the same or to different rings. Dimers of the monomeric diisocyanates and di(isocyanatoaryl) ureas such as di(3-isocyanato-4-methylphenyl) urea, which are the subject of U.S. Patent 2,757,185 may be used.

The following example relates to the preparation of a partially diisocyanate modified alkyd resin.

*Example P*

| | Parts by weight |
|---|---|
| Linseed oil | 145.5 |
| Glycerine | 10.2 |
| Pentaerythritol | 17.0 |
| Stannous fluoride | 0.06 |
| Phthalic anhydride | 19.5 |
| Xylene | 6.5 |
| High boiling aromatic naphtha | 145.0 |
| Toluene diisocyanate | 38.0 |
| Ethanol | 1.5 |

An initial alcoholysis was carried out with the linseed oil, glycerine and pentaerythritol by conventional techniques, using the xylene for azeotropic removal of the water. Upon completion of the alcohlysis the phthalic anhydride was added and the reaction mixture was cooked to an acid number of 5. The reaction mass was then sparged with combustion gases (12 percent $CO_2$, ½ percent CO remainder nitrogen and inert gases) to an acid number less than one. The mass was then thinned with the aromatic naphtha. The diisocyanate was added and the reaction mass was brought to 200° F. After the reaction was substantially complete the ethanol was introduced. The resulting product had the following properties:

| | |
|---|---|
| Solids (percent) | 59.6 |
| Viscosity (Gardner-Holdt) | $Z_3$ |
| Color | 6+ |
| Density (lbs./gal.) | 8.16 |
| Hydroxyl value | 24.5 |
| NCO equivalent | 97,000 |

The above diisocyanate modified alkyd resin was emulsified using one part of a 5 percent aqueous solution of a non-ionic surfactant (octyl phenol ethylene oxide reaction product) to five parts of resin. The emulsion remainded stable after 16 hours at 120° F. The emulsion also remained stable when thinned to 30 percent non-volatile component with water.

Among the various thermoplastic latex compositions which may be employed advantageously as top coats with the primer compositions of the instant invention are included the various vinyl ester, acrylic ester and vinyl aryl homopolymer and copolymer latices. Examples of these latices include those prepared from polymers, homopolymers and copolymers of methyl methacrylate and other acrylates such as ethyl acrylate, styrene copolymers with acrylates and acrylonitrile and/or butadiene. Particularly useful in this regard are the polyvinyl acetate homopolymers and copolymers with such monomers as dibutyl maleate, dibutyl fumarate, ethyl acrylate, and/or 2-ethylhexyl acrylate.

The following table (Table III) sets forth the components of pigment pastes which have been made up using the adducts of maleic anhydride and linseed oil.

The pastes were prepared by well known grinding techniques using a pebble mill and ground for at least 16 hours.

TABLE III

| Paste | Example | | | | |
|---|---|---|---|---|---|
| | Q | R | S | T | U |
| Product of Example J | 160 | 160 | 252 | | 800 |
| Product of Example L | | | | 178 | |
| Titanium dioxide pigment (rutile) | 134 | 134 | 150 | 67 | 670 |
| Aluminum silicate (mica) | 78 | 78 | | 39 | 390 |
| Magnesium silicate (talc) | 72 | 72 | 186 | 36 | 360 |
| Water | 34 | 56 | 49 | 17 | 170 |
| Ethyl alcohol | 20 | 20 | | | |
| Lead emulsifier (24 percent) | | | 10 | | |
| Butyl carbitol acetate | | | | 10 | 100 |
| Naphtha (high boiling point) | | | 20 | | |

The compositions set forth in the following table (Table IV) were prepared and adjusted to a suitable viscosity. Using a standard bristle brush, these compositions were applied to a chalky surface which had previously been coated with a drying oil based titanium dioxide-pigmented air curing composition. After drying overnight a polyvinyl acetate-latex emulsion was applied to the surface and allowed to dry. The films were tested for adhesion and intercoat adhesion by the cross-hatch and tape methods. There was no lifting. All of the compositions had good brushability and brush rewashability with water or water and detergent. The emulsified compositions maintained their stability after five freeze-thaw cycles.

(b) about 55 percent to 94 perecnt by weight of an unsaturated fatty ester, said adduct having at least about 50 percent of its acidity neutralized, and (II) about 30 percent to 95 percent of a resinous composition selected from the class consisting of epoxy esters containing unconjugated unsaturated aliphatic radicals of at least 8 carbon atoms; adducts of an unsaturated fatty acid containing at least 8 carbon atoms and a polymer of an unsaturated primary alcohol and a monomer containing a single $CH_2\!\!=\!\!C\!<$ group; diisocyanate modified alkyd resins, and diisocyanate modified drying oils.

2. The coating composition of claim 1 wherein component II is an epoxy ester containing unconjugated unsaturated aliphatic radicals of at least 8 carbon atoms.

3. The coating composition of claim 1 wherein component II is an adduct of a styrene-allyl alcohol copolymer and an unsaturated fatty acid having at least 8 carbon atoms.

4. The coating composition of claim 1 wherein the adduct is an adduct of maleic anhydride and linseed oil.

5. The coating composition of claim 4 wherein the adduct is further reacted with an alkanol.

6. The coating composition of claim 4 wherein component II is the reaction product of a styrene-allyl alcohol copolymer and an unsaturated fatty acid having at least 8 carbon atoms.

TABLE IV

| | I | II | III | IV | V | VI | VII | VIII |
|---|---|---|---|---|---|---|---|---|
| Product of Ex. J (maleinized linseed oil adduct + linseed alcohol solubilized in ammonia) | 140 | 92 | | | 140 | 140 | 215 | 215 |
| Product of Ex. M (linseed acid-epoxy ester emulsion) | | | 384 | | | | | |
| Product of Ex. N | 374 | 400 | | | 360 | | 300 | |
| Pigment paste of Ex. Q | 498 | 520 | | | | | | |
| Pigment paste of Ex. S | | | 667 | | | | | |
| Pigment paste of Ex. T | | | | 367 | | | | |
| Pigment paste of Ex. U | | | | | 498 | 498 | 498 | 498 |
| Water | 6 | 6 | | 30 | 20 | 35 | 5 | 17 |
| Phenylmercuric acetate | 2 | 2 | 4 | 1 | 2 | 2 | 2 | 2 |
| Manganese naphthenate (6% mineral spirits) | 6 | 6 | 3 | 1.5 | 3 | 3 | 3 | 3 |
| Cobalt naphthenate (6% mineral spirits) | 3 | 3 | 3 | 1.5 | 3 | 3 | 3 | 3 |
| High boiling naphtha | | | 20 | | | | | |
| Soya alkyd resin emulsion 50% solid | | | | 132 | | | | |
| RJ-100 ester emulsion (Product of Ex. P) | | | | | | 345 | | 283 |
| pH | 9.7 | 9.7 | 9.8 | 8.5–9.0 | 9.1 | 9.2 | 9.1 | 9.2 |
| Viscosity (c.p.s., Brookfield viscometer) | [1] 6,080 | [1] 6,700 | 7,640 | | [2] 22,000 | [2] 29,500 | [2] 56,700 | [2] 63,700 |

[1] No. 3 spindle.
[2] No. 4 spindle.

While specific examples of the invention have been described hereinabove, it is not intended to limit the invention thereto, but to include all of the variations and modifications which are within the scope of the appended claims.

We claim:

1. An air-drying aqueous emulsion coating composition consisting essentially of
   (I) from about 5 percent to about 70 percent of an adduct of
      (a) about 6 percent to about 45 percent by weight of a member of the class consisting of alpha-beta-ethylenically unsaturated dicarboxylic acids, and mixtures thereof, and

References Cited by the Examiner

UNITED STATES PATENTS

| 2,188,887 | 1/1940 | Clocker | 260—18 |
| 2,188,888 | 1/1940 | Clocker | 260—18 |
| 2,262,923 | 11/1941 | Clocker | 260—326.3 X |
| 2,576,914 | 12/1951 | Barrett | 260—23 |
| 2,588,890 | 3/1952 | Shokal et al. | 260—32 X |
| 2,820,711 | 1/1958 | Kiebler et al. | 260—404.8 |
| 2,941,963 | 6/1960 | McKenna | 260—22 |
| 2,992,197 | 7/1961 | Boller | 260—23 |
| 3,069,371 | 12/1962 | Carney et al. | 260—23 |
| 3,210,302 | 10/1965 | Bowell et al. | 260—18 |

LEON J. BERCOVITZ, *Primary Examiner.*

T. D. KERWIN, C. W. IVY, *Assistant Examiners.*